(12) United States Patent
Giesbrecht et al.

(10) Patent No.: US 8,284,947 B2
(45) Date of Patent: Oct. 9, 2012

(54) REVERBERATION ESTIMATION AND SUPPRESSION SYSTEM

(75) Inventors: David Giesbrecht, Vancouver (CA); Phillip Hetherington, Vancouver (CA)

(73) Assignee: QNX Software Systems Limited, Kanata, Ontario (CA)

( * ) Notice: Subject to any disclaimer, the term of this patent is extended or adjusted under 35 U.S.C. 154(b) by 2363 days.

(21) Appl. No.: 11/002,328

(22) Filed: Dec. 1, 2004

(65) Prior Publication Data

US 2006/0115095 A1 Jun. 1, 2006

(51) Int. Cl.
*H04B 3/20* (2006.01)

(52) U.S. Cl. ............... 381/66; 381/94.3; 379/406.14; 704/E21.007

(58) Field of Classification Search ............... 381/61, 381/63, 66, 86, 94.1, 94.2, 94.3, 71.8, 71.14, 381/93, 83; 379/406.01, 406.14, 406.12, 379/406.06; 704/E21.007, E21.003, E21.002; 84/DIG. 26, 707, 701
See application file for complete search history.

(56) References Cited

U.S. PATENT DOCUMENTS

| | | | |
|---|---|---|---|
| 3,918,541 A * | 11/1975 | Krieger ............... 180/69.22 |
| 4,486,900 A | 12/1984 | Cox et al. |
| 4,531,228 A | 7/1985 | Noso et al. |
| 4,630,305 A | 12/1986 | Borth et al. |
| 4,811,404 A | 3/1989 | Vilmur et al. |
| 4,843,562 A | 6/1989 | Kenyon et al. |
| 5,027,410 A | 6/1991 | Williamson et al. |
| 5,056,150 A | 10/1991 | Yu et al. |
| 5,146,539 A | 9/1992 | Doddington et al. |
| 5,305,307 A * | 4/1994 | Chu ............................ 370/288 |
| 5,313,555 A | 5/1994 | Kamiya |
| 5,400,409 A | 3/1995 | Linhard |
| 5,479,517 A | 12/1995 | Linhard |
| 5,495,415 A | 2/1996 | Ribbens et al. |
| 5,502,688 A | 3/1996 | Recchione et al. |
| 5,526,466 A | 6/1996 | Takizawa |
| 5,568,559 A | 10/1996 | Makino |
| 5,584,295 A | 12/1996 | Muller et al. |
| 5,617,508 A | 4/1997 | Reaves |
| 5,677,987 A | 10/1997 | Seki et al. |
| 5,680,508 A | 10/1997 | Liu |
| 5,692,104 A | 11/1997 | Chow et al. |
| 5,701,344 A | 12/1997 | Wakui |
| 5,864,806 A * | 1/1999 | Mokbel et al. ................. 704/234 |

(Continued)

FOREIGN PATENT DOCUMENTS

CA 2158847 9/1994

(Continued)

OTHER PUBLICATIONS

Lebart et al.: A New Method Based on Spectral Subtraction for Speech Dereverberation, Acta Acustica ACUSTICA vol. 87 (2001) 359-366.*

(Continued)

*Primary Examiner* — Vivian Chin
*Assistant Examiner* — Con P Tran
(74) *Attorney, Agent, or Firm* — Brinks Hofer Gilson & Lione

(57) ABSTRACT

A signal processing system detects reverberation. The system may suppress the reverberation and improve signal quality. The system analyzes frequency bands of an input signal to determine whether reverberation characteristics are present. When reverberation is detected, the system may attenuate the reverberant frequency band to reduce or eliminate the reverberation.

44 Claims, 8 Drawing Sheets

U.S. PATENT DOCUMENTS

| | | | |
|---|---|---|---|
| 5,933,801 A | 8/1999 | Fink et al. | |
| 5,949,888 A | 9/1999 | Gupta et al. | |
| 6,011,853 A | 1/2000 | Koski et al. | |
| 6,163,608 A | 12/2000 | Romesburg et al. | |
| 6,167,375 A | 12/2000 | Miseki et al. | |
| 6,173,074 B1 | 1/2001 | Russo | |
| 6,175,602 B1 | 1/2001 | Gustafsson et al. | |
| 6,192,134 B1 | 2/2001 | White et al. | |
| 6,199,035 B1 | 3/2001 | Lakaniemi et al. | |
| 6,405,168 B1 | 6/2002 | Bayya et al. | |
| 6,434,246 B1 | 8/2002 | Kates et al. | |
| 6,507,814 B1 | 1/2003 | Gao | |
| 6,587,816 B1 | 7/2003 | Chazan et al. | |
| 6,591,234 B1 * | 7/2003 | Chandran et al. | 704/225 |
| 6,643,619 B1 | 11/2003 | Linhard et al. | |
| 6,687,669 B1 | 2/2004 | Schrögmeier et al. | |
| 6,782,363 B2 | 8/2004 | Lee et al. | |
| 6,822,507 B2 | 11/2004 | Buchele | |
| 6,859,420 B1 | 2/2005 | Coney et al. | |
| 6,909,041 B2 | 6/2005 | Ohta | |
| 6,910,011 B1 | 6/2005 | Zakarauskas | |
| 7,117,149 B1 | 10/2006 | Zakarauskas | |
| 7,319,770 B2 * | 1/2008 | Roeck et al. | 381/321 |
| 7,508,948 B2 * | 3/2009 | Klein et al. | 381/66 |
| 7,742,607 B2 * | 6/2010 | Karjalainen et al. | 381/66 |
| 2001/0028713 A1 | 10/2001 | Walker | |
| 2002/0071573 A1 | 6/2002 | Finn | |
| 2002/0176589 A1 | 11/2002 | Buck et al. | |
| 2003/0040908 A1 | 2/2003 | Yang et al. | |
| 2003/0216907 A1 | 11/2003 | Thomas | |
| 2004/0078200 A1 | 4/2004 | Alves | |
| 2004/0138882 A1 | 7/2004 | Miyazawa | |
| 2004/0165736 A1 | 8/2004 | Hetherington et al. | |
| 2004/0167777 A1 | 8/2004 | Hetherington et al. | |
| 2004/0213415 A1 * | 10/2004 | Rama et al. | 381/63 |
| 2005/0114128 A1 | 5/2005 | Hetherington et al. | |
| 2005/0240401 A1 | 10/2005 | Ebenezer | |
| 2006/0034447 A1 | 2/2006 | Alves et al. | |
| 2006/0074646 A1 | 4/2006 | Alves et al. | |
| 2006/0100868 A1 | 5/2006 | Hetherington et al. | |
| 2006/0116873 A1 | 6/2006 | Hetherington et al. | |
| 2006/0136199 A1 | 6/2006 | Nongpiur et al. | |
| 2006/0251268 A1 | 11/2006 | Hetherington et al. | |
| 2006/0287859 A1 | 12/2006 | Hetherington et al. | |
| 2007/0033031 A1 | 2/2007 | Zakarauskas | |

FOREIGN PATENT DOCUMENTS

| | | |
|---|---|---|
| CA | 2157496 | 10/1994 |
| CA | 2158064 | 10/1994 |
| EP | 0 076 687 A1 | 4/1983 |
| EP | 0 629 996 A2 | 12/1994 |
| EP | 0 629 996 A3 | 12/1994 |
| EP | 0 750 291 A1 | 12/1996 |
| EP | 1 450 353 A1 | 8/2004 |
| EP | 1 450 354 A1 | 8/2004 |
| EP | 1 669 983 A1 | 6/2006 |
| JP | 06269084 A2 | 9/1994 |
| JP | 06319193 A | 11/1994 |
| JP | 08-065211 | 8/1996 |
| JP | 2001-108738 | 4/2001 |
| JP | 2003-224898 | 8/2003 |
| JP | 2003-255955 | 9/2003 |
| JP | 2004-274234 | 9/2004 |
| KR | 1995-9528 | 4/1995 |
| WO | WO 00-41169 A1 | 7/2000 |
| WO | WO 0156255 A1 | 8/2001 |
| WO | WO 01-73761 A1 | 10/2001 |

OTHER PUBLICATIONS

Berk et al., "Data Analysis with Microsoft Excel", Duxbury Press, 1998, pp. 236-239 and 256-259.

Learned, R.E. et al., A Wavelet Packet Approach to Transient Signal Classification, Applied and Computational Harmonic Analysis, Jul. 1995, pp. 265-278, vol. 2, No. 3, USA, XP 000972660. ISSN: 1063-5203. abstract.

Puder, H. et al., "Improved Noise Reduction for Hands-Free Car Phones Utilizing Information on a Vehicle and Engine Speeds", Sep. 4-8, 2000, pp. 1851-1854, vol. 3, XP009030255, 2000. Tampere, Finland, Tampere Univ. Technology, Finland Abstract.

Quatieri, T.F. et al., Noise Reduction Using a Soft-Dection/Decision Sine-Wave Vector Quantizer, International Conference on Acoustics, Speech & Signal Processing, Apr. 3, 1990, pp. 821-824, vol. Conf. 15, IEEE ICASSP, New York, US XP000146895, Abstract, Paragraph 3.1.

Quelavoine, R. et al., Transients Recognition in Underwater Acoustic with Multilayer Neural Networks, Engineering Benefits from Neural Networks, Proceedings of the International Conference EANN 1998, Gibraltar, Jun. 10-12, 1998 pp. 330-333, XP 000974500. 1998, Turku, Finland, Syst. Eng. Assoc., Finland. ISBN: 951-97868-0-5. abstract, p. 30 paragraph 1.

Seely, S., "An Introduction to Engineering Systems", Pergamon Press Inc., 1972, pp. 7-10.

Shust, Michael R. and Rogers, James C., Abstract of "Active Removal of Wind Noise From Outdoor Microphones Using Local Velocity Measurements", J. Acoust. Soc. Am., vol. 104, No. 3, Pt 2, 1998, 1 page.

Shust, Michael R. and Rogers, James C., "Electronic Removal of Outdoor Microphone Wind Noise", obtained from the Internet on Oct. 5, 2006 at: <http://www.acoustics.org/press/136th/mshust.htm>, 6 pages.

Simon, G., Detection of Harmonic Burst Signals, International Journal Circuit Theory and Applications, Jul. 1985, vol. 13, No. 3, pp. 195-201, UK, XP 000974305. ISSN: 0098-9886. abstract.

Wahab A. et al., "Intelligent Dashboard With Speech Enhancement", Information, Communications, and Signal Processing, 1997. ICICS, Proceedings of 1997 International Conference on Singapore, Sep. 9-12, 1997, New York, NY, USA, IEEE, pp. 993-997.

Zakarauskas, P., Detection and Localization of Nondeterministic Transients in Time series and Application to Ice-Cracking Sound, Digital Signal Processing, 1993, vol. 3, No. 1, pp. 36-45, Academic Press, Orlando, FL, USA, XP 000361270, ISSN: 1051-2004. entire document.

Avendano, C., Hermansky, H., "Study on the Dereverberation of Speech Based on Temporal Envelope Filtering," Proc. ICSLP '96, pp. 889-892, Oct. 1996.

Nakatani, T., Miyoshi, M., and Kinoshita, K., "Implementation and Effects of Single Channel Dereverberation Based on the Harmonic Structure of Speech," Proc. of IWAENC-2003, pp. 91-94, Sep. 2003.

Fiori, S., Uncini, A., and Piazza, F., "Blind Deconvolution by Modified Bussgang Algorithm", Dept. of Electronics and Automatics—University of Ancona (Italy), ISCAS 1999.

Vieira, J., "Automatic Estimation of Reverberation Time", Audio Engineering Society, Convention Paper 6107, 116th Convention, May 8-11, 2004, Berlin, Germany, pp. 1-7.

* cited by examiner

REVERBERATION ESTIMATION AND SUPPRESSION SYSTEM

BACKGROUND OF THE INVENTION

1. Technical Field

This invention relates to signal processing systems, and more particularly to a system that may estimate and suppress reverberation.

2. Related Art

Sound is susceptible to noise that can corrupt, mask, or otherwise affect clarity, intelligibility, directionality, or other characteristics of the sound. Reflected sound is a common noise source. Reflected sound overlaps the source signal at a sensor such as a microphone with time-delayed versions of the original signal. The overlap, also known as reverberation, sometimes reduces the perceptibility of speech or other sounds.

Reverberation may make sound seem distant or tinny, seem to be emanating from a tunnel or cave, or may otherwise impair the quality or intelligibility of that sound. Reverberation is common in open and closed spaces. Cars, offices, gymnasiums, churches, and other closed spaces may be affected by the echo-like affect of reverberation. Reverberations may also affect open areas near walls, buildings, cliffs, or other structures.

Some prior signal processing systems attempt to reduce reverberation through blind deconvolution. Blind deconvolution attempts to estimate the transfer function of the room, office, or other reverberant signal environment. The sensed signal is applied to an inverse filter to estimate the original signal.

Blind deconvolution attempts to exactly recover the original signal through the determined signal environment transfer function. This process is an extremely complicated and computationally intensive technique. As such, it can be unsuitable for devices such as mobile phones that provide real time response or for devices that may not be able to devote adequate processing resources to the blind deconvolution.

There is a need for a system that estimates and suppresses reverberant signal components.

SUMMARY

This invention provides a signal processing system that estimates and suppresses reverberation effects in a non-stationary signal originating in an acoustical environment. Examples of signals that may be processed include speech or music recorded by a microphone in a room or car. The system analyzes frequency bands in an input signal to adaptively estimate the rate of reverberation decay in each frequency band. The rate of reverberation decay in each frequency band can be considered to be a linear relationship in units of decibels (dB) versus time. The estimated rate of reverberation decay is used to determine when a given frequency band is dominated by reverberant signal energy, and the system may then attenuate the reverberant parts of the signal.

The reverberation suppression system includes signal analysis logic. The signal analysis logic identifies a reverberant characteristic, such as linear decay, in one or more frequency bands and may adaptively estimate the rate of reverberation decay in those frequency bands. The reverberation system also includes attenuation logic. The attenuation logic may independently suppress signal content in one or more of the reverberant frequency bands. This invention may be implemented as a real-time signal processing system or may be implemented as an off-line system.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

The reverberation estimation and suppression system examines a non-stationary signal for characteristics of reverberation. The system examines the signal in one or more frequency bands and adaptively estimates the reverberation characteristics in each frequency band. When reverberation is detected in a frequency band, the system attenuates the signal in that frequency band. This system may be implemented as a real-time signal processing algorithm or may be implemented as an off-line system.

Figure 1:
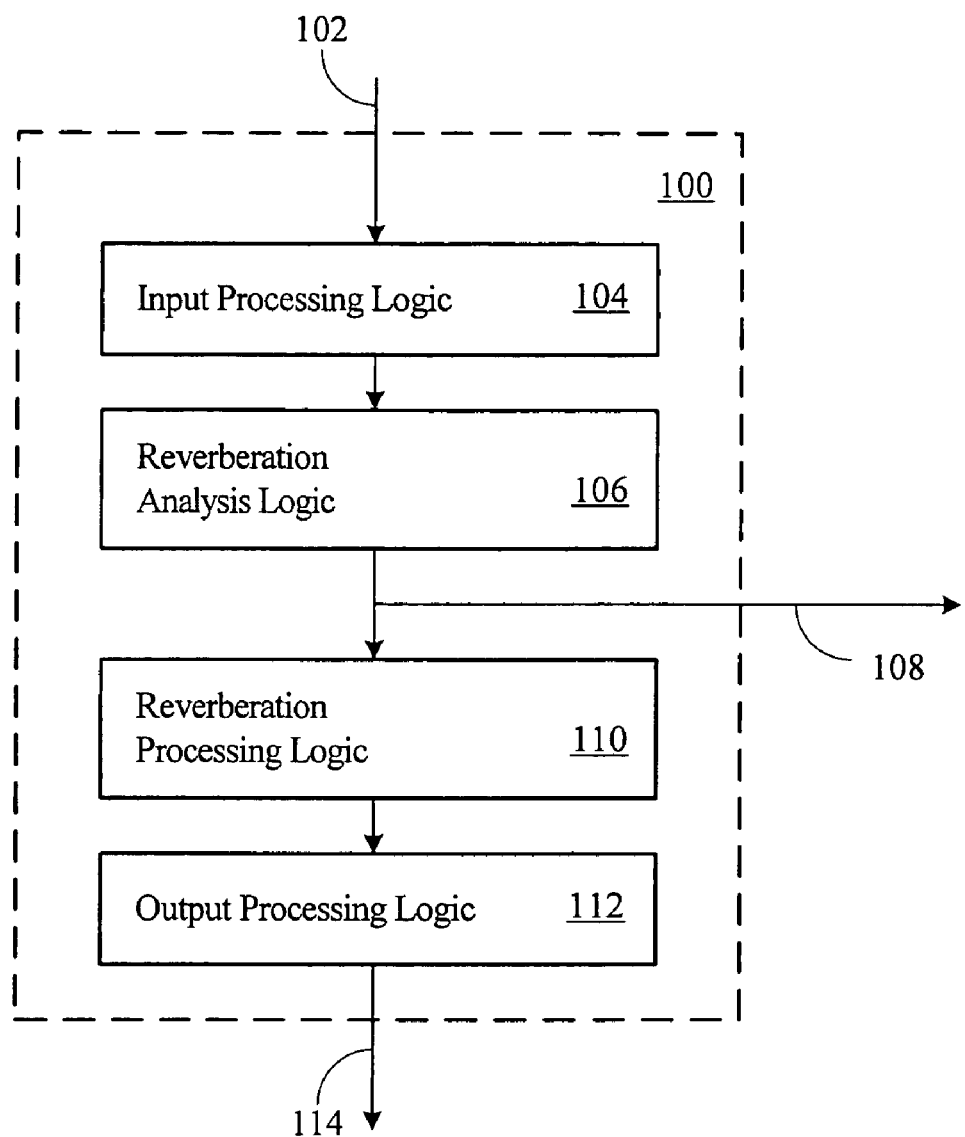
FIG. 1 is a reverberation estimation and suppression system.

In FIG. 1, a reverberation estimation and suppression system 100 ("system 100") receives a signal through the signal input 102. The signal input 102 may be a microphone input signal or other input signal that may exhibit the effects of acoustical reverberation. The signal input 102 is coupled to input processing logic 104. The input processing logic 104 may perform pre-processing, such as sampling and signal-to-noise ratio (SNR) estimation on the signal before the signal is analyzed by the reverberation analysis logic 106.

The reverberation analysis logic 106 examines the signal for reverberant characteristics. The reverberation analysis logic 106 may communicate characteristic information to other systems over the analysis output 108. Additionally, the reverberation analysis logic 106 may provide the characteristic information to reverberation processing logic 110.

The reverberation processing logic 110 suppresses reverberation in the signal. The reverberation processing logic 110 may suppress reverberant signal content in one or more frequency bands. At a given instant in time, suppression may occur in the frequency bands identified as containing reverberant energy by the reverberation analysis logic 106. The output processing logic 112 then performs post-processing, such as digital to analog conversion and/or signal transmission of the reverberation suppressed signal.

Figure 2:
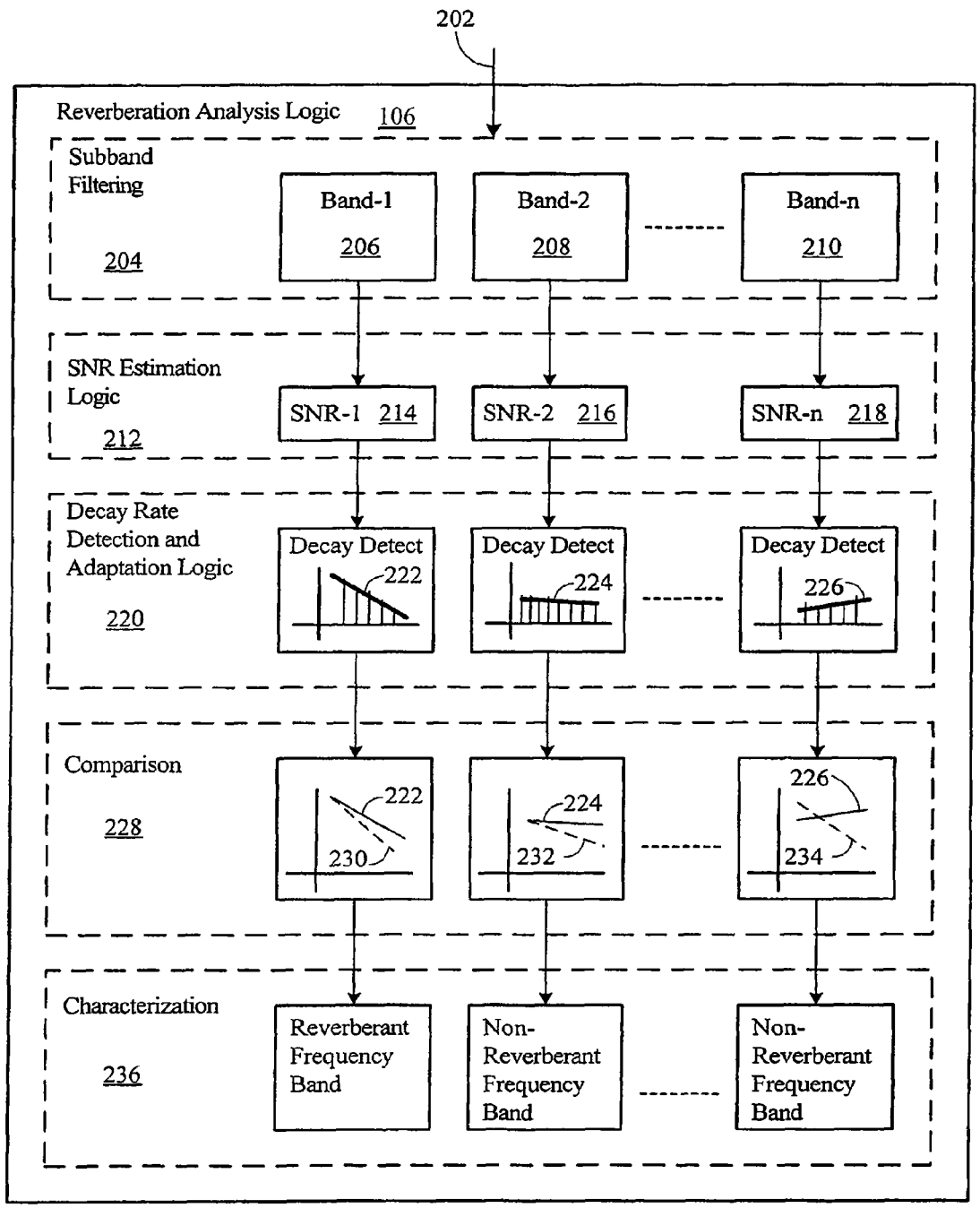
FIG. 2 is reverberation analysis logic.

In FIG. 2, the system 100 receives a signal through the signal input 202. Filtering logic 204 divides the signal into one or more frequency bands. For example, sub-band filtering may be used and may be implemented by windowed-FFT of overlapped time segments, bandpass filterbanks, polyphase filterbanks, wavelet decomposition or other sub-band filtering techniques. Reverberation characteristics may vary with frequency. Thus, each frequency band may be independently examined for reverberant content. Three frequency bands are labeled in FIG. 2 as band-1 206, band-2 208, and band-n 210. The exact number and configuration of frequency bands may depend on the desired application and implementation of the system.

The signal may be divided into linear frequency bands for reverberation analysis. In speech processing applications, the signal may be divided into 2-16 frequency bands or more over the desired frequency range. For telephony speech, the frequency range may be approximately 250 Hz to about 3500 kHz. The system 100 may also non-linearly divide the signal into frequency bands.

The frequency bands may correspond to one or more auditory critical frequency bands along the basilar membrane of an ear. Auditory critical band analysis may employ a non-linear frequency scale such as the Bark scale or the Equivalent Rectangular Bandwidth (ERB) scale. A critical band frequency scale may be used in telephony applications of the system 100.

The frequency bands may also correspond to a scale of pitches that are perceptibly equal in distance from one another. Above approximately 500 Hz, increasingly larger bands produce perceptible equal pitch increments. The perceptibly equal pitch increments may be established as Mel frequency bands. The Mel frequency scale may be used when the system 100 is part of a speech recognition application.

The system 100 may provide signal-to-noise (SNR) estimation logic 212 for one or more of the 'n' frequency bands 206-210. The SNR estimation logic for three of the frequency bands is labeled 214, 216, and 218. The SNR estimates 214-218 may be achieved using background noise estimation techniques, such as minimum statistics methods, or other SNR estimation techniques.

At a given instant in time, the decay rate detection logic 220 examines each sub-band signal to estimate its current decay rate over a given analysis time interval. Decay rate estimation may be achieved by fitting a linear slope to the energy (in units of dB) in each sub-band over a time interval. The linear slope may be estimated using linear regression or other slope estimation techniques. The time interval used may depend on factors such as the expected range of reverberation decay rate for a given application, the average SNR of the signal, or other factors. A time interval of approximately 100 ms may be employed for a speech signal with 20-30 dB SNR recorded in an enclosure with a reverberation time (RT60) of about 300 ms. The analysis time interval may differ for different frequency bands. The time interval may also adaptively change depending on the current signal characteristics such as SNR and estimated reverberation decay rate. The current estimated decay rate for a given sub-band may be used to update the estimated reverberation decay rate (in units of dB/s) for that sub-band. The update may occur when the current decay rate and the signal meet certain criteria such as: SNR exceeds a selected threshold, the current decay rate is negative, the linear regression error is small, or other criteria. The estimated reverberation decay rate may be adapted using a leaky integrator (i.e. 1st order IIR filter) or some other data time-averaging method. The adaptation rate of a leaky integrator may be proportional to the current rate of decay of the signal in the frequency band. A quickly decaying signal may result in a quickly adapting reverberation decay rate estimate.

The reverberation decay rate detection logic 220 maintains estimates of the reverberation decay rate for multiple frequency bands. As the environment changes, the system adapts to that environment and provides estimates of the reverberation decay rate expected in the environment. Alternatively, the estimates of expected reverberation decay rate may be pre-stored in a memory in the system 100 for one or more frequency bands.

In each frequency band, the reverberation decay rate may be expressed in terms of an approximately constant negative slope in units of dB/s. At a given instant in time, the signal energy in each frequency band in dB may be expressed as 20*log ('amplitude'), where 'amplitude' may be the amplitude of a dominant frequency component in the frequency band, the average amplitude of the frequency components in the frequency band, a weighted average of the frequency components in the frequency band, or other measure of the signal in the frequency band.

Additionally or alternatively, at a given instant in time, the signal energy in each frequency band in dB may be expressed as 10*log ('power'), where power may be an average power in the frequency band, a maximum power component in the frequency band, or other measure of power in the frequency band.

In FIG. 2, the decay rate detection logic 220 examines each signal frequency band for reverberant characteristics affecting the frequency band. The decay rate detection logic 220 may track signal strength, expressed in terms of dB over time in each frequency band. In band-1 206, the signal has an approximately linear signal decay rate 222. In band-2 208, the signal level is approximately constant 224. In band-3 210, the signal has a signal growth rate 226.

The comparison logic 228 may perform comparisons of signal characteristics against known or expected reverberation characteristics. Expressed in dB versus time, acoustical reverberation often decays linearly or almost linearly. The comparison logic 228 may determine whether signal decay is linear or almost linear in a frequency band. For such signals, the comparison logic 228 also may compare the decay rate in the frequency band to the expected reverberation decay rates, such as those labeled 230, 232, and 234. Any expected reverberation decay rate may be adaptively estimated using time-averaging techniques such as those described above (e.g. using leaky integrators), may be set specifically for a frequency band or may be shared between multiple frequency bands.

The characterization logic 236 determines whether reverberation is affecting the signal. For each frequency band, the characterization logic 236 may independently determine whether reverberation is present. The characterization may be a hard threshold or may employ soft decision logic optionally including a smooth transition between "reverberant" and "non-reverberant" decisions for a given frequency band and/or also between frequency bands. The determination may be based on the comparisons performed by the comparison logic 228.

Figure 3:
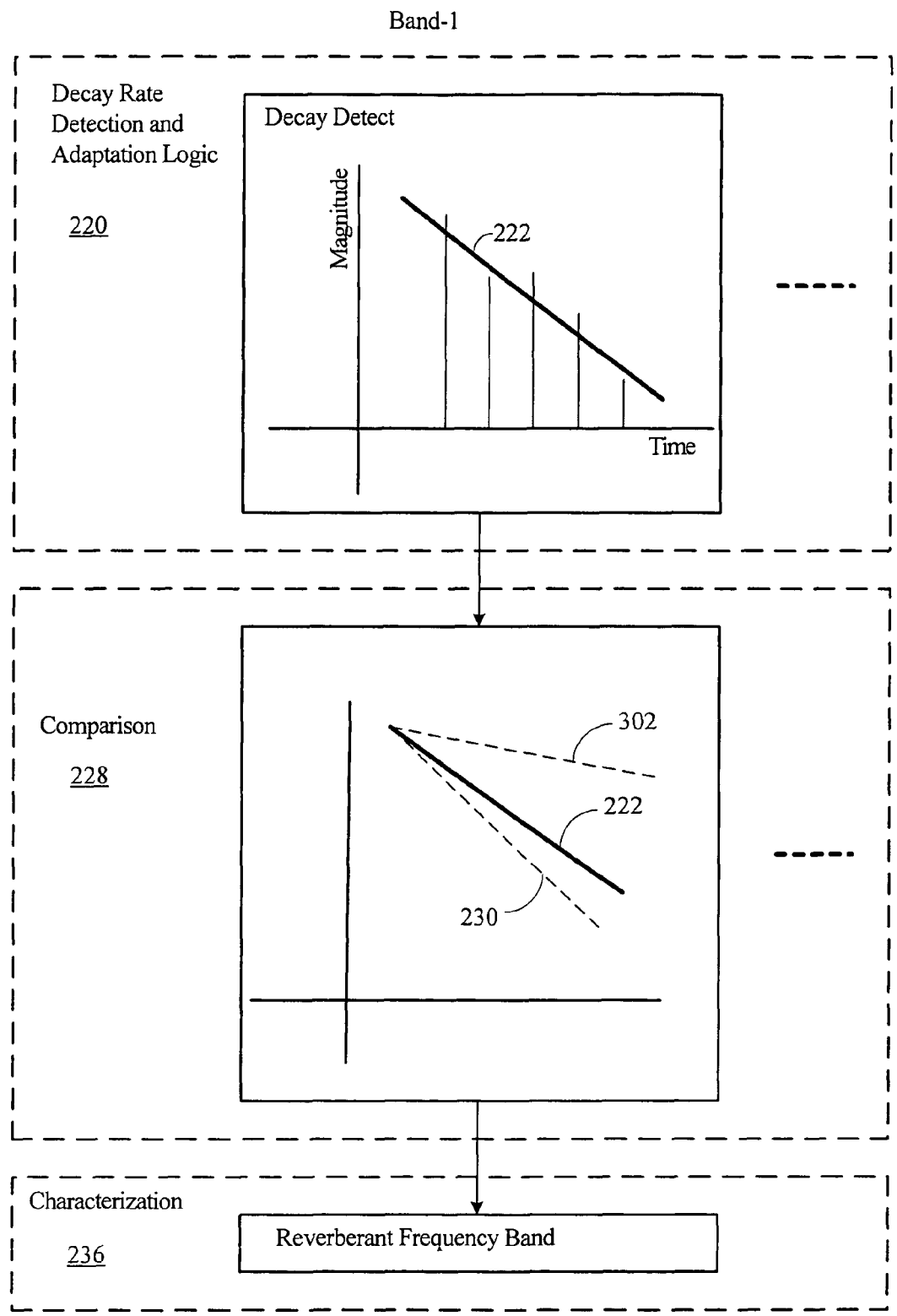
FIG. 3 is frequency band analysis and reverberant characteristic comparison.

In FIG. 3, the signal decay rate 222 is approximately linear. FIG. 3 also contains two other decay rate plots: a lower decay limit 230 and an upper decay limit 302. These decay rate limits may be used to determine whether the signal in this sub-band is currently being dominated by reverberant energy. If the current signal decay rate 222 is close to the lower decay limit 230 then it may be characterized as "reverberant". Other tests may be employed. However, if the current signal decay rate 222 is close to or greater than the upper decay limit 302 then it may be characterized as "non-reverberant". Under ordinary circumstances, an acoustic signal does not decay faster than the reverberation decay rate. Thus, the lower decay limit 230 may correspond to the expected reverberation decay rate for this frequency band (e.g. as determined in the decay rate detection logic 220). The upper decay limit 302 may be set to the lower decay limit 230 plus a constant K−1 (in units of dB/s). This constant K−1 may depend on signal characteristics such as average SNR, expected reverberation decay rate, etc. Additionally, K−1 may depend on the desired amount of reverberation suppression for the overall system (thus a higher value for K−1 may result in more aggressive reverberation suppression). Since acoustical systems exhibit a reverberation decay curve that decreases with time, both the lower decay limit 230 and the upper decay limit 302 may have a slope less than 0.

In FIG. 3, the decay slope for the signal in band-1 206 is between the upper decay limit 302 and the lower decay limit 230, and is close to the lower decay limit 230. Therefore, the characterization logic 236 determines that band-1 206 is currently a reverberant frequency band.

Figure 4:
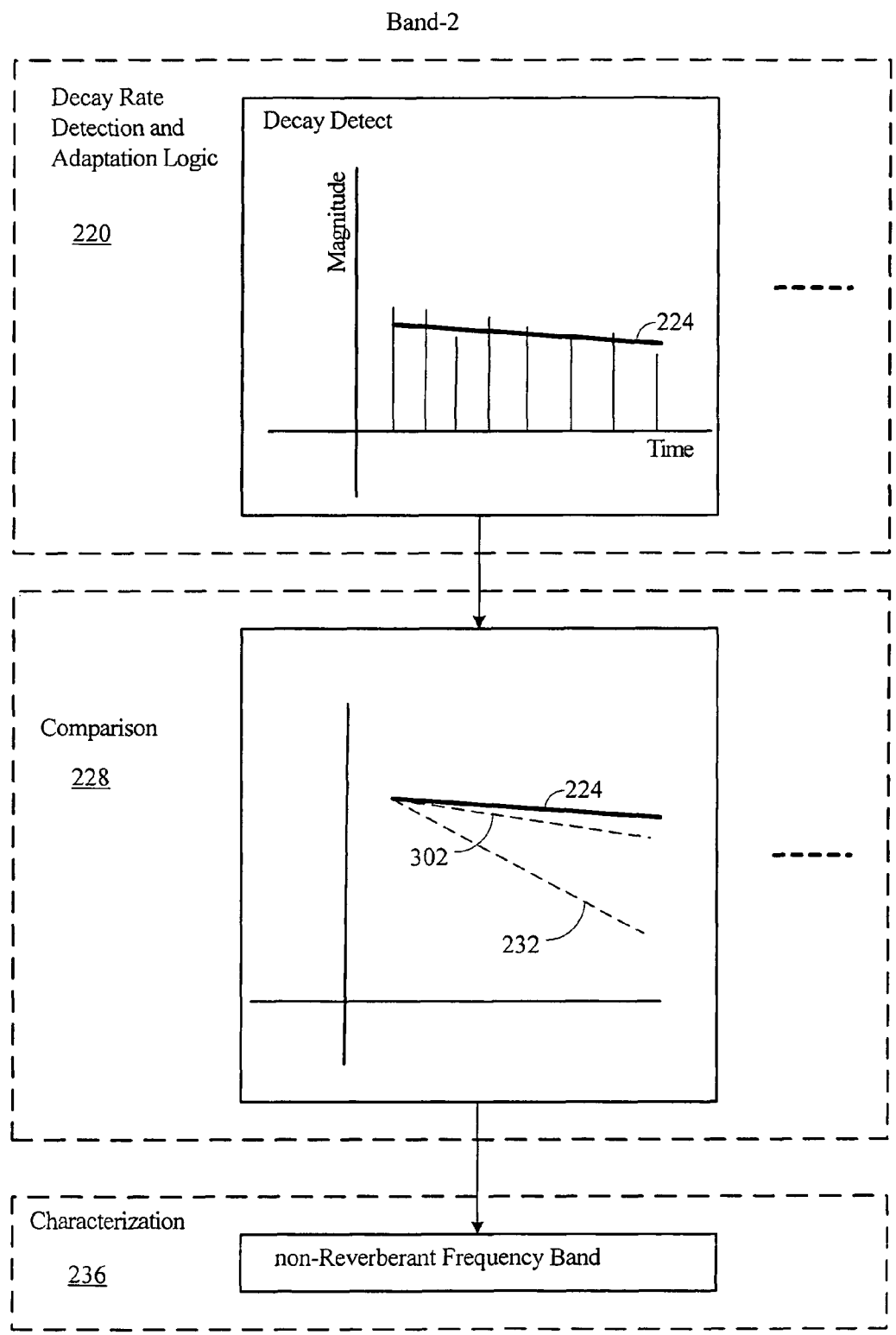
FIG. 4 is frequency band analysis and reverberant characteristic comparison.

In FIG. 4, band-2 has an expected reverberation decay rate 232 that forms a lower decay limit. An upper decay limit 304 may also be established in a manner similar to that described for FIG. 3. In the example shown in FIG. 4, the signal decay rate 224 is approximately constant. The characterization logic 236 determines that band-2 208 is currently a non-reverberant frequency band.

Figure 5:
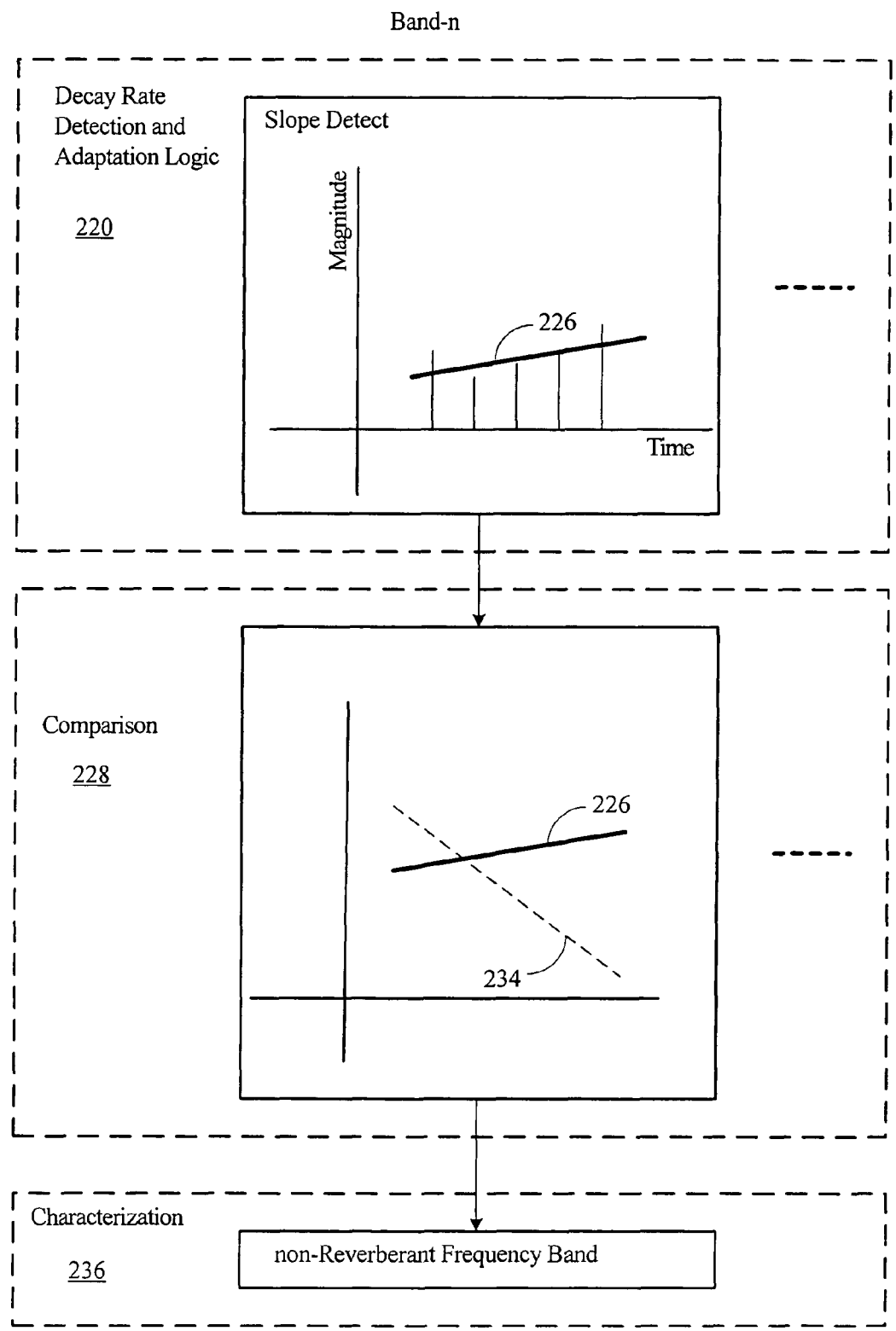
FIG. 5 is frequency band analysis and reverberant characteristic comparison.

In FIG. 5, band-n 210 has an approximately linear signal growth rate 226. The positive slope of the growth rate 226 means that reverberant energy is not dominant in this frequency band. The characterization logic 236 determines that band-n 210 is currently a non-reverberant frequency band.

The expected reverberation decay rates may be established using the adaptive estimation methods described in the decay rate detection logic 220. The decay rates may also be established based on measurements taken in specific environments. The decay rates may estimate reverberation time in one or more frequency bands in a car or other vehicle. Similarly, the decay rates may be established from measurement of reverberation time in an office, outdoors in relatively open or closed spaces, or in other environments.

Figure 6:
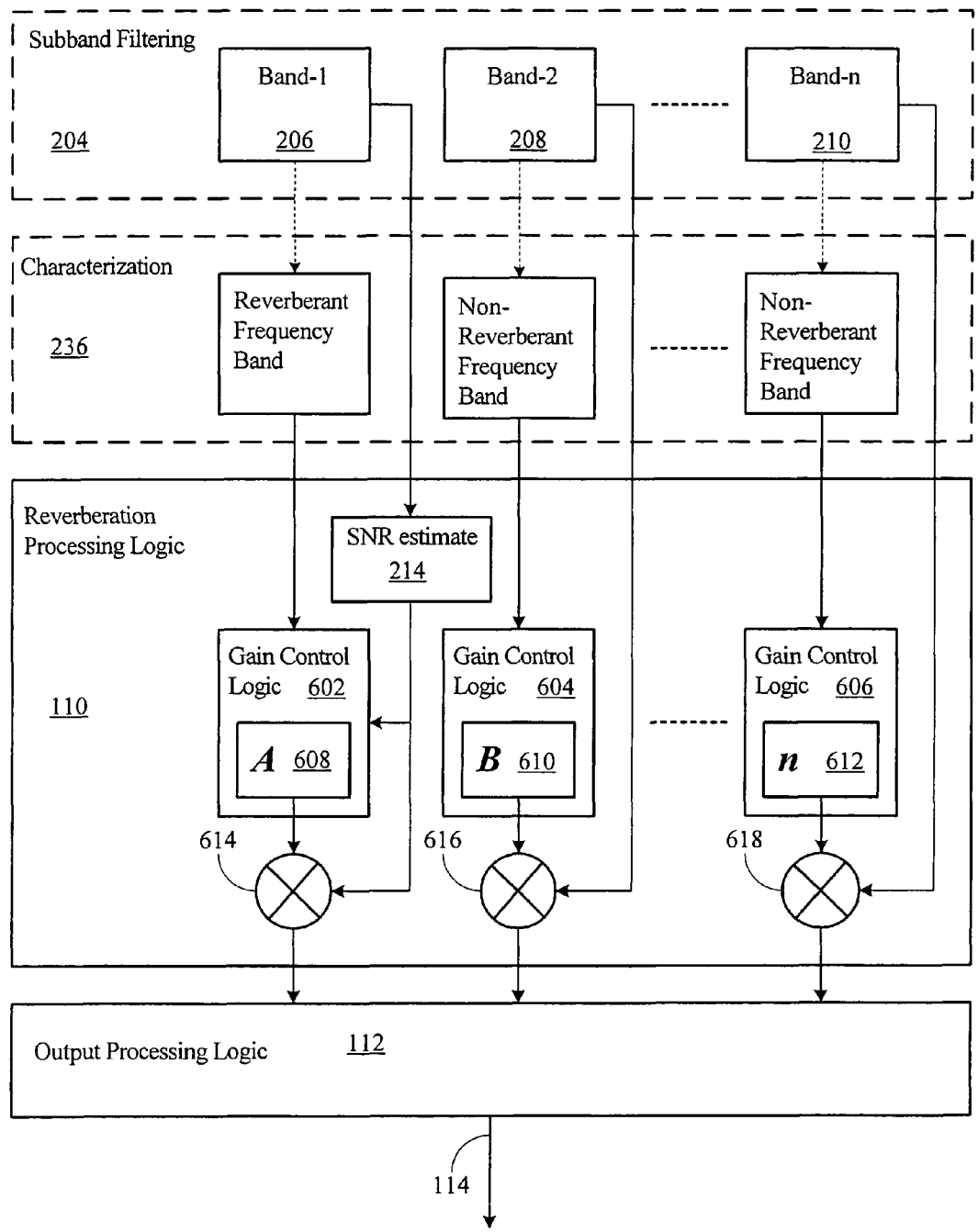
FIG. 6 is reverberation processing logic and output processing logic.

In FIG. 6, the reverberation processing logic 110 attenuates reverberant frequency bands. The reverberation processing logic 110 may include gain control logic, a gain constant, and attenuation logic for each frequency band. The gain control logic 602, 604, and 606, the gain parameter 608, 610, and 612, and the attenuation logic 614, 616, and 618 are illustrated for band-1 206, band-2 208, and band-n 210. For each frequency sub-band, the attenuation logic 614, 616, and 618 multiplies a gain parameter 608, 610 and 612 by the current sub-band signal in units of amplitude.

The reverberation processing logic 110 of FIG. 1 may operate in response to the determination of whether each frequency band is a reverberant frequency band. When reverberant frequency band is detected, the reverberation processing logic 110 may entirely attenuate or reduce the signal components in that frequency band. In non-reverberant frequency bands, the reverberation processing logic 110 may pass signal components in the frequency band unaltered.

The reverberation processing logic 110 may attenuate the signal components in a frequency band in relation to their rate of decay. As the rate of decay approaches the expected rate of reverberant decay in the band, the attenuation may increase. The attenuation may be maximum when the rate of decay matches the expected rate of reverberant decay in the frequency band.

The attenuation may also be influenced by a signal to noise ratio (SNR). During periods of low SNR, some or all of the reverberation may be masked by background noise. The noise may inhibit the accurate detection of reverberant energy. When SNR is low, the maximum allowed attenuation may also be low. When SNR is high reverberation may be more accurately detected. The maximum allowed attenuation may increase at high SNR to aggressively suppress reverberant signal content.

The reverberation processing logic 110 may use an SNR estimate 214 for one or more frequency bands. The SNR estimate may be obtained from the SNR estimation logic 212 as shown in FIG. 2.

In response to band-1 206 being a reverberant frequency band, the gain control logic 602 may adjust the gain parameter 608. The gain control logic 602 may set the gain parameter 608 to a value between 1 (i.e. no signal attenuation) and a lower limit being greater than or equal to 0. This lower limit may correspond to the current maximum allowable signal attenuation for a given sub-band, as mentioned above. In practice, the value of the gain parameter 608 at a given instant in time may be based not only on the characterization result 236, but also on the signal SNR, rate of signal decay, previous gain parameter values or on other parameters. The attenuation logic 614 may reduce or eliminate frequency components at every frequency in the frequency band-1 206, may eliminate frequency components above a threshold in the frequency band-1 206, or may otherwise attenuate the frequency band-1 206.

In response to the determination that band-2 208 is a non-reverberant to frequency band, the gain control logic 604 may adjust the gain parameter 610. The gain parameter 610 may have a value close to or equal to 1 and may selectively pass one or more frequency components in band-2 208. Responsive to the determination that band-n 210 is a non-reverberant frequency band, the gain control logic 606 may also set the gain parameter 612 to a value close to or equal to 1 in order to pass one or more signal components in band-n 210.

Once processed, the signal may then pass to the output processing logic 112. The output processing logic 112 may transform the signal in some desired way before outputting a reverberation suppressed signal on the output 114. The output processing logic 112 may include frequency band resynthesis processing such as synthesis filterbanks, IFFT and overlap-and-add techniques. The techniques may recombine the individual frequency sub-band signals into a final resynthesized output signal 114. The configuration and implementation of the output processing logic 112 may vary based on the configuration of the input sub-band filtering 204. The output processing logic 112 may also include a digital to analog converter, or may amplify or otherwise process the reverberation suppressed signal.

Figure 7:
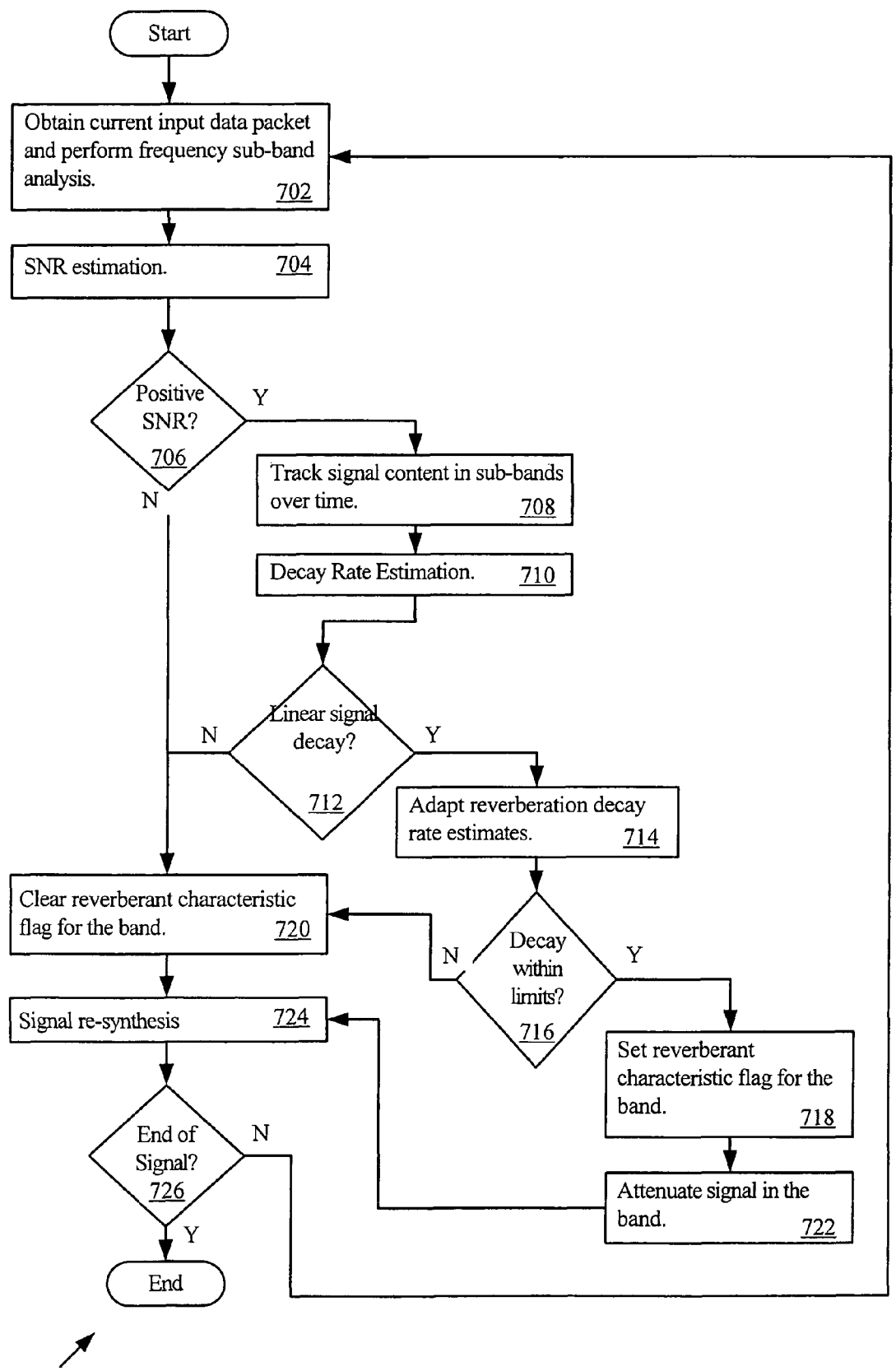
FIG. 7 is a flow diagram of acts that may be taken by a reverberation estimation and suppression system.

FIG. 7 is a flow diagram of the acts that analyze and/or process a signal to estimate and suppress reverberation. As shown, the system 100 obtains the current input data packet (Act 702). The input data packet may represent digitized audio data recorded from a microphone, stored in a data file, or obtained from another sound input. The system 100 divides the input signal into frequency sub-bands according to the Bark or ERB scale or other set of frequency bands (Act 702). The signal's amplitude in each sub-band may be determined in units of decibels, dB and the system 100 may estimate the SNR in one or more of the bands (Act 704).

When the SNR is positive (Act 706), such as during periods of speech, the system 100 may track the signal content over time (Act 708) and examine each band for reverberant characteristics. The system 100 may estimate the current decay rate of the sub-band signal (Act 710). If the decay rate (e.g., in units of dB versus seconds) is approximately linear, the system 100 may adapt a reverberation decay estimate for that sub-band (Act 714). The estimated reverberation decay rate may be used to update decay rate limits that the system 100 employs to characterize a sub-band as "reverberant" or "non-reverberant" at a given instance in time (Act 716).

When a sub-band signal with positive SNR is decaying linearly with time, the system 100 may determine if the linear signal decay is within an upper and/or a lower decay limit (Act 716). When the signal content in the frequency band is affected by reverberation, the system 100 may set a flag for that band, or provide other information that indicates that the frequency band includes reverberant content (Act 718). When the signal content is non-reverberant, the system 100 may clear the flag for the band, or provide other information (Act 720).

The system 100 attenuates reverberant signal content (Act 722). Each frequency band may be attenuated independently of any other frequency band. The attenuation may vary between bands and may wholly or partially attenuate the signal within frequency band. Speech, such as a vowel sound followed by a consonant sound, may include upper frequency bands with increasing energy and lower frequency bands with decreasing energy. The lower frequency bands may experience reverberation and may be suppressed without affecting upper frequency bands conveying the consonant sound.

After sub-band reverberation suppression, the system 100 may re-synthesize the current sub-band signals into time domain data (Act 724). The system 100 may also continue to monitor an input signal for all or part of the signal duration (Act 726). When the signal is present, the system 100 continues to track the signal content and suppress reverberation. At any time during its operation, the system 100 may set or change reverberation thresholds, attenuation gains, the division into frequency bands, or other parameters.

Figure 8:
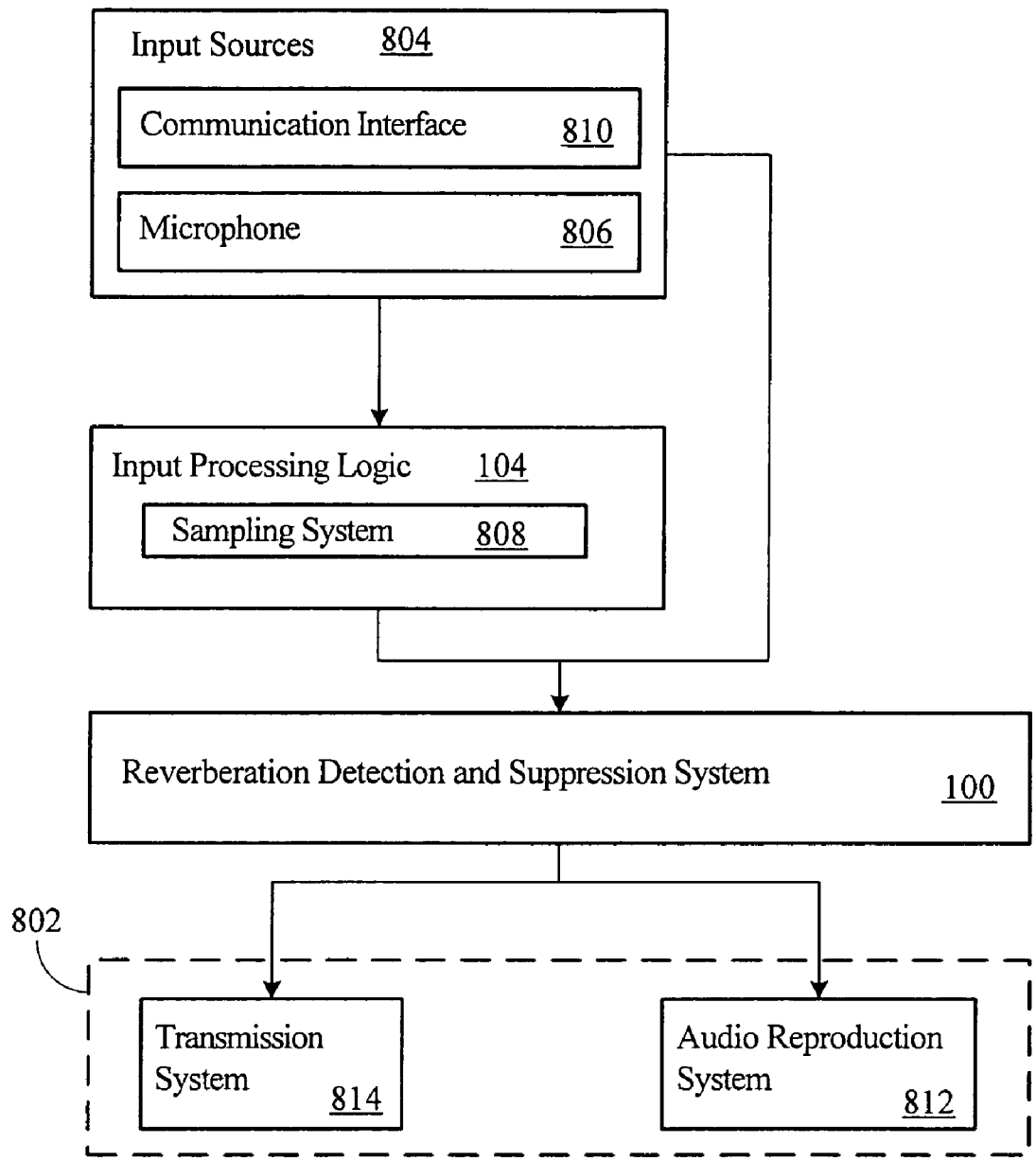
FIG. 8 is a reverberation estimation and suppression system with pre-processing and post-processing logic.

In FIG. 8, the system 100 operates with input processing logic 104 and post-processing logic 802. The system 100 may accept input through the input sources 804. The input sources 804 may include digital signal sources such as the communication interface 810 or analog signal sources such as from a microphone 806.

The microphone 806 may be an omni-directional microphone, a directional microphone, other type of microphone, or array of multiple microphones. The microphone 806 may be connected to the estimation and suppression system 100 through a sampling system 808. The sampling system 808 may convert analog signals sensed by the microphone 806 into digital form at a selected sampling rate.

The sampling rate may be selected to capture any desired frequency content for any non-stationary signals of interest. For speech, the sampling rate may be approximately 8 kHz or 11 kHz or more. For music, the sampling rate may be approximately 22 to about 44 kHz. Other sampling rates may be used for speech, music or other non-stationary signals.

The digital signal sources may include a communication interface 810, other circuitry or logic in the system in which the system 100 is implemented, or other signal sources. The system 100 may accept the digital signal samples with or without additional pre-processing. The system 100 may also connect to post-processing logic 802. The post-processing logic 802 may include an audio reproduction system 812, digital and/or analog data transmission systems 814, or other processing logic.

The audio reproduction system 812 may include digital to analog converters, filters, amplifiers, and other circuitry or logic. The audio reproduction system 812 may be a speech and/or music reproduction system. The audio reproduction system 812 may be implemented in a cellular phone, car phone, digital media player/recorder, radio, stereo, portable gaming device, or other device employing sound reproduction.

The transmission system 814 may provide a network connection, digital or analog transmitter, or other transmission circuitry and/or logic. The transmission system 814 may communicate reverberation suppressed signals generated by the system 100 to other devices. In a car phone the transmission system 814 may communicate enhanced signals from the car phone to a base station or other receiver through a wireless connection such as through a ZigBee, Mobile-Fi, Ultrawideband, Wi-fi, or a WiMax format or network.

The system 100 may be implemented in hardware, software, or a combination of hardware and software. The hardware and software may include a digital signal processor (DSP) that executes instructions stored in a memory. The system 100 may process digital samples of the signal, or may itself digitize an analog input signal for reverberation estimation and suppression. Instructions that cause hardware to perform reverberation estimation and suppression may be stored on a machine readable medium such as a disk, flash card, or other memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A reverberation suppression system comprising:
signal analysis logic operative to analyze a signal decay rate in a first frequency band of a signal, where the signal analysis logic is operative to identify a first reverberant characteristic in the first frequency band of the signal based on a comparison between the signal decay rate in the first frequency band and a first reverberation decay rate threshold, where the signal analysis logic is operative to adapt the first reverberation decay rate threshold over time based on an identification of a linear signal decay characteristic, and where the signal analysis logic comprises a processor that executes instructions stored in a memory; and
attenuation logic responsive to identification of the first reverberant characteristic to attenuate the signal in the first frequency band to generate a reverberation suppressed signal.

2. The system of claim 1, where the signal analysis logic is operable to identify the first reverberant characteristic when the signal decay rate is an approximately linear decay rate in the first frequency band.

3. The system of claim 2, where the first reverberant characteristic is an approximately linear decay in dB over Time in the first frequency band.

4. The system of claim 1, where the signal analysis logic is operable to identify the first reverberant characteristic when the signal decay rate in the first frequency band approximately meets the first reverberation decay rate threshold.

5. The system of claim 4, where the first reverberation decay threshold is an enclosed space reverberation decay rate threshold.

6. The system of claim 4, where the first reverberation decay threshold is a vehicle interior reverberation decay rate threshold.

7. The system of claim 4, where:
the signal analysis logic is further operable to identify, in a second frequency band, a second reverberant characteristic when a second decay rate approximately meets a second reverberation decay rate threshold; and
the attenuation logic is also operable to attenuate the signal in the second, frequency band in response to identification of the second reverberant characteristic.

8. The system of claim 7, where the first reverberation decay rate threshold and the second reverberation decay rate threshold are frequency band thresholds.

9. The system of claim 1, where:
the signal analysis logic is further operable to analyze a signal decay rate in a second frequency band of the signal to identify a second reverberant characteristic in the second frequency band; and
the attenuation logic is also operable to attenuate the signal in the second frequency band in response to identification of the second reverberant characteristic.

10. The system of claim 1, further comprising signal-to-noise ratio logic, where the analysis logic identifies the reverberant characteristic when the signal-to-noise ratio logic determines a positive signal-to-noise ratio.

11. The system of claim 1, further comprising adaptive filter logic operable to provide an estimate of an expected reverberation decay rate in the first frequency band, where the signal analysis logic is operative to determine whether the first frequency band is a reverberant frequency band based on a comparison between the expected reverberation decay rate and the signal decay rate measured in the first frequency band.

12. The system of claim 1, further comprising signal-to-noise ratio estimation logic operable to determine a signal-to-noise ratio of the signal in the first frequency band;
where the attenuation logic is responsive to the signal-to-noise ratio estimation logic, and where the attenuation logic is operable to attenuate the signal in the first frequency band by a higher amount when the signal-to-noise ratio is relatively high and the first reverberant characteristic is identified than when the signal-to-noise ratio is relatively low and the first reverberant characteristic is identified.

13. The system of claim 1, where the signal analysis logic is operable to monitor a signal-to-noise ratio in the first frequency band and the signal decay rate to determine when to adapt the first reverberation decay rate threshold, and where the signal analysis logic is operable to adapt the first reverberation decay rate threshold upon determination that a signal-to-noise ratio in the first frequency band is positive and the signal in the first frequency band has a linear decay rate.

14. A reverberation analysis system comprising:
a signal input;
signal analysis logic coupled to the signal input and operable to estimate a first decay rate for signal content of a first frequency band, where the signal analysis logic is operable to adapt a first reverberation decay rate threshold over time based on an identification of a linear signal decay characteristic, and where the signal analysis logic comprises a processor that executes instructions stored in a memory;
comparison logic coupled to the signal analysis logic and operable to perform a comparison between the first decay rate and the first reverberation decay rate threshold;
characterization logic coupled to the comparison logic and operable to identify whether the first frequency band is a reverberant frequency band based on the comparison between the first decay rate and the first reverberation decay rate threshold;
attenuation logic operable to attenuate the first frequency band to generate a reverberation suppressed signal in response to a characterization of the first frequency band as the reverberant frequency band; and
a signal output coupled to the attenuation logic and operable to output the reverberation suppressed signal.

15. The system of claim 14, where:
the signal analysis logic is further operable to estimate a second decay rate for signal content of a second frequency band; and
the comparison logic is further operable to compare the second decay rate to a second reverberation decay rate threshold.

16. The system of claim 15, where the first and second frequency bands comprise Bark frequency bands.

17. The system of claim 15, where the first and second frequency bands comprise Mel frequency bands.

18. The system of claim 14, where the signal input couples a speech signal to the signal analysis logic.

19. The system of claim 14, where the signal analysis logic is operable to fit a line to signal decay over time in the first frequency band to estimate the first decay rate.

20. The system of claim 14, where the characterization logic comprises a digital signal processor that executes instructions stored in a memory.

21. A method for suppressing reverberation, comprising:
adapting a reverberation decay rate threshold over time based on an identification of a linear signal decay characteristic;
determining a division of a signal into multiple frequency bands;
determining a signal decay rate in at least one frequency band of the multiple frequency bands;
identifying the at least one frequency band as being a reverberant frequency band based on a comparison between the signal decay rate in the at least one frequency band and the reverberation decay rate threshold; and
attenuating the signal in the reverberant frequency band to generate a reverberation suppressed signal.

22. The method of claim 21, where identifying comprises;
comparing the signal decay rate to the reverberation decay rate threshold; and
characterizing the at least one frequency band as being the reverberant frequency band based on a use of the reverberation decay rate threshold as a hard threshold or as part of a soft decision logic that includes a smooth transition between characterizing the at least one frequency band as reverberant or non-reverberant.

23. The method of claim 22, where the reverberation decay rate threshold is an enclosed space reverberation decay rate threshold.

24. The method of claim 22, where the reverberation decay rate threshold is a vehicle interior reverberation decay rate threshold.

25. The method of claim 21, where determining comprises:
determining the signal decay rate in each of the frequency bands;

determining whether each frequency band is a reverberant frequency band based on its signal decay rate; and
attenuating each reverberant frequency band.

26. The method of claim 21, where identifying comprises: determining whether the signal decay rate is linear.

27. The method of claim 26, where identifying further comprises:
determining whether the signal decay rate approximately meets the reverberation decay rate threshold.

28. The method of claim 21, further comprising determining a signal-to-noise ratio for the reverberant frequency band; and
where attenuating comprises attenuating the signal in the reverberant frequency band by a higher amount when the signal-to-noise ratio is relatively high than when the signal-to-noise ratio is relatively low.

29. The method of claim 21, further comprising:
monitoring a signal-to-noise ratio in the first frequency band and the signal decay rate to determine when to adapt the reverberation decay rate threshold; and
adapting the reverberation decay rate threshold upon determination that a signal-to-noise ratio in the first frequency band is positive and the signal in the first frequency band has a linear decay rate.

30. The method of claim 21, where attenuating comprises attenuating the signal by attenuation logic that comprises a digital signal processor that executes instructions stored in a memory.

31. A product comprising:
a non-transitory machine readable medium; and
machine readable instructions embodied on the machine readable medium that:
adapt a reverberation decay rate threshold over time based on an identification of a linear signal decay characteristic;
determine a signal decay rate in a frequency band of an input signal;
identify a reverberant frequency band based on a comparison between the signal decay rate and the reverberation decay rate threshold; and
attenuate the signal in the reverberant frequency band to generate a reverberation suppressed signal.

32. The product of claim 31, where the instructions that determine the signal decay rate comprise instructions that:
fit a line to signal decay over time in the frequency band.

33. The product of claim 31, where the input signal is a speech signal.

34. The product of claim 31, further comprising instructions that:
determine a division of the input signal into Bark frequency bands.

35. The product of claim 31, further comprising instructions that:
determine a division of the input signal into Mel frequency bands.

36. The product of claim 31, where the instructions that identify the reverberant frequency band comprise instructions that:
compare the signal decay rate to an office space reverberation decay rate threshold.

37. The product of claim 31, where the instructions that identify the reverberant frequency band comprise instructions that:
compare the signal decay rate to a vehicle interior reverberation decay rate threshold.

38. The product of claim 31, where the instructions that identify the reverberant frequency band comprise instructions that:
compare the signal decay rate to a mobile phone speakerphone reverberation decay rate threshold.

39. The product of claim 31, where the determination instructions, identification instructions, and attenuation instructions are responsive to detecting speech in the input signal.

40. The product of claim 31, where the determination instructions, identification instructions, and attenuation instructions are responsive to SNR in the input signal being above an SNR threshold.

41. The product of claim 31, where the instructions that attenuate the signal comprises instructions that attenuate multiple reverberant frequency bands.

42. A reverberation suppression system comprising:
signal analysis hardware operative to identify a first reverberant characteristic in a first frequency band of a signal;
signal-to-noise ratio estimation hardware operable to determine a signal-to-noise ratio of the signal in the first frequency band; and
attenuation hardware responsive to the signal analysis hardware and the signal-to-noise ratio estimation hardware, where the attenuation hardware is operable to attenuate the signal in the first frequency band to generate a reverberation suppressed signal, where the attenuation hardware is operable to set an attenuation level for the signal in the first frequency band based on the signal-to-noise ratio of the signal in the first frequency band, and where the attenuation hardware is operable to attenuate the signal in the first frequency band to a greater extent when the signal-to-noise ratio is relatively high and the first reverberant characteristic is identified than when the signal-to-noise ratio is relatively low and the first reverberant characteristic is identified;
where the signal analysis hardware is operative to identify the first reverberant characteristic in the first frequency band based on a comparison between a signal decay rate in the first frequency band and a reverberation decay rate threshold, and where the signal analysis hardware is operative to adapt the reverberation decay rate threshold over time based on an identification of a linear signal decay characteristic.

43. The system of claim 42, where the attenuation hardware comprises a maximum allowed attenuation level, and where the maximum allowed attenuation level is set to a higher level when the signal-to-noise ratio is relatively high and the first reverberant characteristic is identified than when the signal-to-noise ratio is relatively low and the first reverberant characteristic is identified.

44. The system of claim 42, where the attenuation hardware comprises a digital signal processor that executes instructions stored in a memory.

* * * * *

UNITED STATES PATENT AND TRADEMARK OFFICE
CERTIFICATE OF CORRECTION

PATENT NO. : 8,284,947 B2
APPLICATION NO. : 11/002328
DATED : October 9, 2012
INVENTOR(S) : David Giesbrecht et al.

It is certified that error appears in the above-identified patent and that said Letters Patent is hereby corrected as shown below:

In the Claims

In column 9, claim 7, line 13, immediately after "in the second" delete ",".

In column 10, claim 17, line 26, after "bands comprise" replace "MeI" with --Mel--.

In column 10, claim 22, line 50, immediately after "identifying comprises" replace ";" with --:--.

In column 11, claim 35, line 54, after "input signal into" replace "MeI" with --Mel--.

Signed and Sealed this
Twenty-third Day of April, 2013

Teresa Stanek Rea
*Acting Director of the United States Patent and Trademark Office*